United States Patent
Nakatsuka et al.

[11] Patent Number: 5,810,978
[45] Date of Patent: Sep. 22, 1998

[54] METHOD OF REDUCING METALLIC IMPURITIES IN OZONE GAS PIPING

[75] Inventors: Suguru Nakatsuka, Nara; Shiro Mukai, Hannan; Jiro Kobayashi, Sakai; Seiji Nakamoto, Kitakatsuragi-gun, all of Japan

[73] Assignee: Sumitomo Precision Products Co., Ltd., Amagasaki, Japan

[21] Appl. No.: 757,284

[22] Filed: Nov. 27, 1996

[30] Foreign Application Priority Data

Nov. 27, 1995 [JP] Japan .................................. 7-332753

[51] Int. Cl.$^6$ ..................................... C01B 13/10
[52] U.S. Cl. .......................................... 204/176
[58] Field of Search ...................................... 204/176

[56] References Cited

U.S. PATENT DOCUMENTS 5,370,846 12/1994 Yokomi et al. ................. 422/186.07
5,632,868 5/1997 Harada et al. ........................ 204/176

*Primary Examiner*—Kathryn L. Gorgos
*Assistant Examiner*—Kishor Mayekar
*Attorney, Agent, or Firm*—Oblon, Spivak, McClelland, Maier & Neustadt, P.C.

[57] ABSTRACT

A method of reducing metallic impurities in an ozone gas piping means, which entails producing ozone gas in an ozone-generating means and piping the produced ozone gas to stainless steel piping means, wherein the ozone gas is produced from a raw material oxygen gas containing at least one additional gas selected from the group consisting of nitrogen, helium, carbon dioxide, carbon monoxide and ozone; the additional gas being used in an amount of 0.025% by volume or more in total, with the proviso that nitrogen is not used as or in said additional gas in an amount of more than 1.0% by volume.

5 Claims, 2 Drawing Sheets

METHOD OF REDUCING METALLIC IMPURITIES IN OZONE GAS PIPING

BACKGROUND OF THE INVENTION

1. Field of the Invention

The present invention relates to a method of reducing metallic impurities in ozone gas piping.

2. Description of the Background

In semiconductor manufacture ozone gas is now used in forming film oxides, ashing resists, and washing silicon wafers. So-called high purity oxygen of 99.95% or more, produced by silent electric discharge as raw material gas, is normally used, because ozone gas of high density and reduced impurities is required for semiconductor manufacture. The high purity/high density ozone gas generated is fed to the site of use by piping made of stainless steel, such as SUS316L for example, for preventing pollution thereof.

However, the density of the ozone gas is reduced as time passes when high purity oxygen is used as a raw material gas. In an attempt to solve this problem, a microcatalytic gas, of high purity, has been added to high purity oxygen in certain amounts (Japanese Patent Application Laid-Open Tokkaihei No. 1-282104, Tokkaihei No1 1-298003, Tokkaihei No. 3-2189051. Nitrogen gas of high purity (99.99% or more) as a catalyst gas is often used in semiconductor manufacture because it is easily available.

However, it has recently been determined that when high purity/high density ozone gas produced using high purity oxygen is fed to the site of use, the ozone gas obtained at the feeding location includes metal impurities, thus presenting the possibility that the metallic impurities will deleteriously affect semiconductor manufacture. It is considered that the metallic impurities detected in the supplying location are produced from the feeding piping made of stainless steel, because ozone gas produced by an ozone generator includes little, if any, metallic impurities. However, use of higher quality piping material is impractical due to the increased cost thereof.

Thus, a need exists for a method of reducing metallic impurities in ozone gas piping without the attendant higher cost which accompanies the use of higher quality piping.

SUMMARY OF THE INVENTION

Accordingly, it is an object of the present invention to provide a means for reducing metallic impurities in ozone gas piping without using more expensive piping materials.

The above object and others are provided by a method of reducing metallic impurities in ozone gas piping, which entails producing ozone gas in an ozone-generating means and piping the produced ozone gas to stainless steel piping means, wherein the ozone gas is produced from a raw material gas containing high density/high purity oxygen gas and at least one additional gas selected from the group consisting of nitrogen, helium, carbon dioxide, carbon monoxide and argon; the additional gas being used in an amount of about 0.025% by volume or more in total, with the proviso that nitrogen is not used as or in the additional gas in an amount of more than about 1.0% by volume.

DESCRIPTION OF THE PREFERRED EMBODIMENTS

Figure 1:
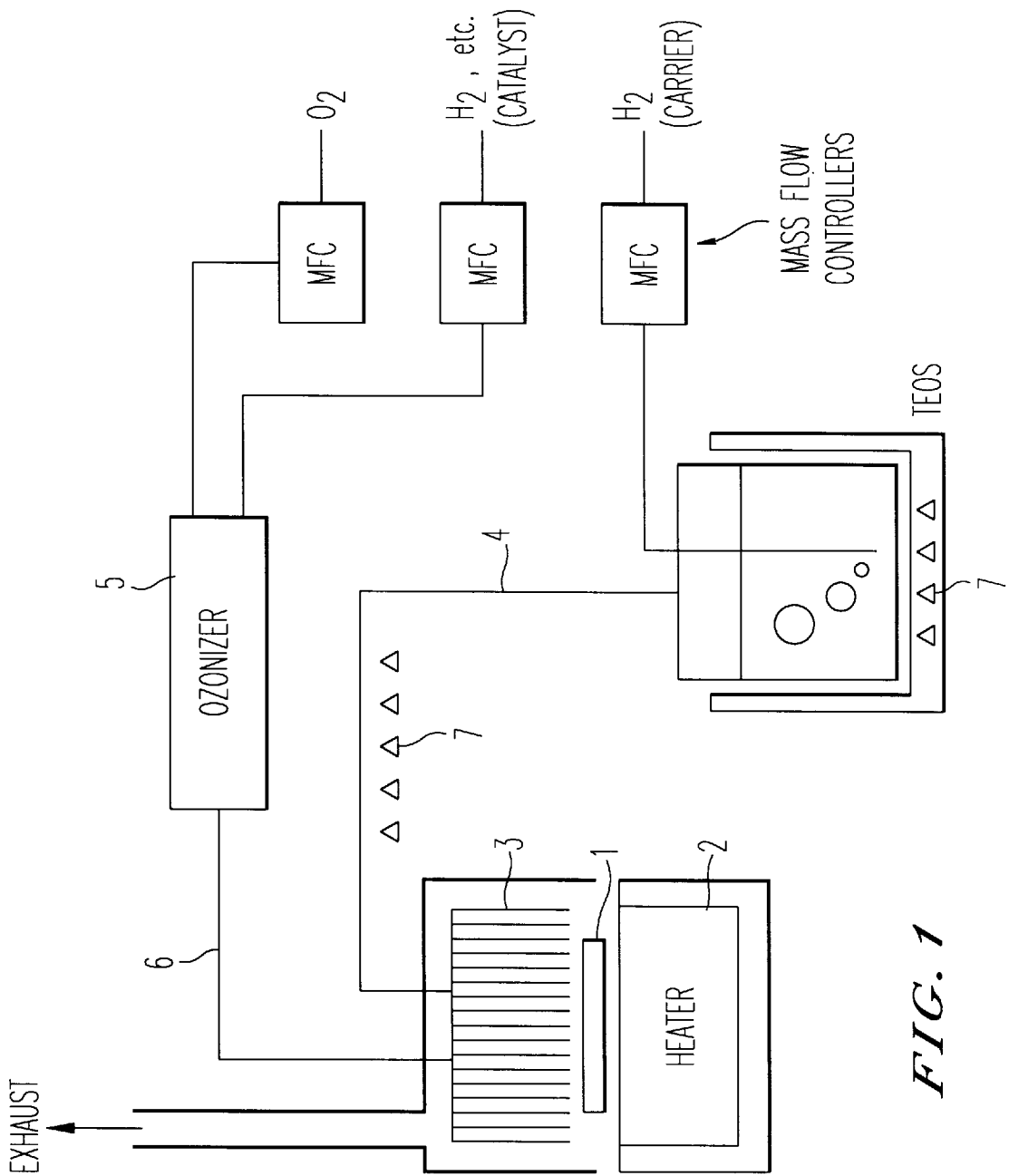
FIG. 1 illustrates a film making apparatus using the present invention.

The present invention provides a method of reducing the amount of metallic impurities from ozone gas supply piping which contaminate ozone in the supply piping. The problem of metallic impurities arises from feeding ozone gas, produced by an ozone generator using high purity oxygen, through the stainless steel piping.

The present invention is predicated, in part, upon the surprising discovery that this problem can be alleviated by using a certain amount of nitrogen gas as a catalyst in the high purity oxygen, thereby preventing the reduction in density of the ozone gas as time passes.

In particular, when nitrogen gas is present in the raw material high purity oxygen, nitrogen oxide is produced as a by-product in the product ozone gas to deteriorate or corrode the inner face of the stainless steel piping. As a result, the metallic impurities originating from the stainless steel piping are separated at the site of use.

It has been considered that the nitrogen oxide is not harmful enough to corrode the stainless steel piping, because the dew point of the oxygen in the high purity oxygen used in semiconductor manufacture is sufficiently low. As the dew point of the raw material gas is lowered when the ozone is produced with the use of an ozone producing machine, nitrogen oxide production as a by-product is prevented.

It has been further discovered that the metallic impurity amount may be controlled to be negligible even if a sufficient amount of other catalytic gas is added as long as the nitrogen density in the raw material gas is restricted to be about 1.0% by vol. or lower, and, preferably, 0.25% by vol. or lower.

The present invention, thus, relates to a method of reducing metallic impurities in ozone gas piping, whereby one or more of nitrogen, helium, argon, carbon dioxide and/or carbon monoxide are added in an amount of about 0.025% by vol. or more in total to the high purity oxygen gas, which is used as a raw material gas for production of ozone from an ozone generator. Notably, the nitrogen gas density in the raw material is limited to 1.0% by vol. or lower.

In the present method of reducing metallic impurities, the catalytic gas is added with the object of preventing reduction in ozone density with the passage of time. One or more of nitrogen, helium, argon, carbon dioxide and/or carbon monoxide are used as the catalytic gas. Even when other catalytic gases are used, a nitrogen gas density of 1.0% by vol. or lower, and preferably, 0.5% by vol. or lower, and more preferably, 0.25% by vol. or lower is used.

The catalytic gas is used in a total amount of no more than about 10% by volume based upon the total gas volume. However, helium, argon, carbon dioxide and/or carbon monoxide are preferably used in an amount of up to about 1.0% by vol. or even more in total as a sufficient adding effect is obtained even when small amounts of 1.0% by vol. or lower are used. Therefore, helium, argon, carbon dioxide and carbon monoxide are tolerable for metallic oxide reduction when used in an amount of about 1.0% by vol. or more in total amount, although the nitrogen gas used is preferably not added in an amount of more than about 1.0% by volume.

Also, the effect of controlling economy in the zone density is larger with nitrogen gas. Thus, it is effective to mix a small amount of nitrogen gas into one or more of helium gas, argon gas, carbon dioxide gas and carbon monoxide gas to form a mixture of the additional gases.

The present method of reducing metallic impurities can be applied, particularly, to an ozone gas feeding system which is used in semiconductor manufacture, and can also be applied to an ozone gas feeding system in the manufacture of liquid crystal display. The purity of the high purity oxygen is preferably about 99.99% or more, whereas the purity of the catalytic gas is preferably about 99.99% or more.

The present invention will now be further illustrated by reference to certain examples which are provided solely for purposes of illustration and are not intended to be limitative.

Example 1

FIG. 1 is a model view of a film making apparatus showing the application example of the present invention. This is a so-called TEOS-CVD. The silicon basic plate 1 is heated by heater 2, while the raw material gas for making film is sprayed on the surface of the silicon basic plate 1 by nozzle 3 of a branch plate type.

The raw material gases for film manufacturing use are TEOS and ozone gas. TEOS, or $Si(OC_2H_5)_4$, is heated as a liquid and evaporated, and is fed, together with the nitrogen as a carrier gas, to nozzle 3 through stainless steel piping 4. Reference numeral 7 denotes a heater. In the ozone gas, high purity oxygen gas is used as the raw material gas, and nitrogen gas as the catalytic gas, with both being fed to ozone producing machine 5. The ozone gas produced is fed to nozzle 3 through stainless steel pipe 6. The silicon oxygen film is formed on the surface by the spraying operation of the respective gases on the surface of silicon basic plate 1 from nozzle 3.

At this time, metallic oxide orginating from stainless steel piping 6 for feeding oxygen gas becomes problematic. When the catalytic gas used is nitrogen, the density in the raw material gas is from about 0.025% by vol. to 1.0% by vol., and preferably about 0.5% by vol. or lower and even more preferably about 0.25% by vol. or lower. When the catalytic gas used is helium gas, the density used is from about 0.025 to 10% by vol. When the catalytic gas used is argon gas, carbon dioxide gas, or carbon monoxide gas, an amount of about 0.025 to 10% by vol. When a mixture of these gases is used, the total amount used is from about 0.025 to 10% by vol. The nitrogen gas amount used is about 1.0% by vol. or lower, preferably 0.5% by vol. or lower, and even more preferably, 0.25% by vol. or lower.

The present invention will now be further described with reference to certain Examples and comparative Examples. The examples herein are provided solely for purposes of ilustration and are not intended to be limitative.

EXAMPLES

Ozone gas produced by an ozone generator (Table 1) of a silent electric discharge type is fed through stainless steel piping. The metallic impurity amount, and the ozone density of the feeding gas were measured.

As a raw material gas, the following gas mixture was used: high purity oxygen gas of 99.99% or more in purity, nitrogen gas of 99.999% or more in purity in an amount of 0.020 to 1.5% by vol., argon gas of 99.999% or more in purity in an amount of 0.020 to 12% by vol., helium gas of 99.999% or more in purity in an amount of 0.018 to 11% by vol., or carbon dioxide gas of 99.999% or more in purity in an amount of 0.010 to 15% by vol., carbon monoxide gas of 99.999% or more in purity in an amount of 0.020 to 14% by vol., nitrogen gas of 0.2% by vol. and argon gas of 0.28 to 3.0% by vol. mixed were used, and nitrogen gas of 0.2% by vol. and helium gas of 0.6 to 5.3% by vol. mixed were used.

SUS 316L-EP of ¼ inch (6.35 mm) in outer diameter, 1 mm in thickness, 1 m in length was used as stainless steel piping. Composition (standard value) of the SUS 316L (JIS G3459) is shown in Table 2. "EP" denotes electrical polishing, and refers to electrolytic polishing.

Quantitative analysis of the metallic impurities was conducted by spraying on the surface of silicon wafer ozone gas of ozone density of 120 $g/m^3$ for 15 minutes×6 liter/min., decomposing the surface with fluorine acid steam by a vapor phase decomposing method (VPD: Vapor Phase Decomposition), and analyzing the recovered decomposition liquid by ICP-MS (Induction Coupled Plasma Mass Spectroscopy.)

The measurement of nitrogen oxide, conducted to confirm whether the reduction in metallic impurities was caused by the influence of nitrogen oxide, was conducted by introducing ozone gas of 120 $g/m^3$ to the air with pure water contained therein for 12 hours×6 liter/min. to absorb or collect the nitrogen oxide in the ozone gas, and then analyzing the solution by ion chromatography.

The measurement of the ozone density entailed observing the stability of the ozone density using an infrared ray extinction ozone monitor.

The measured results are shown in Tables 3 through 8. The tolerance of the metallic impurities with respect to the gas to be used in a semiconductor manufacturing step is normally $10^{11}$ atoms/$cm^2$ or lower on the silicon wafer. The reduction of metallic impurities, the ozone density stability, and the economy were evaluated by the following standards.

Reduction of Metallic Impurities

Evaluation by the largest amount of metallic elements:

X ; about $10^{12}$ atoms/$cm^2$

Δ ; about $10^{11}$ atoms/$cm^2$

○ ; about $10^{10}$ atoms/$cm^2$

⊙ ; about $10^4$ atoms/$cm^2$

Ozone Density Stability

Evaluation by ozone density variation amount in continuous one hour:

X; 120 $g/M^3$ ±10% or more

○; 120 $g/m^3$ ±10% or lower

Economy

Evaluation in the additional amount of catalytic gas:

X; 10% or more

Δ; 1% or more 10% or lower

○; 1% or lower

As shown in Table 3, the amount of each of Cr, Fe and Ni can each be reduced to $10^{11}$ atoms/$cm^2$ or lower by using a nitrogen gas density of 1.0% by vol. or lower. However, the stability of the ozone density is reduced when a nitrogen gas density of 0.025% by vol. or lower is used.

When the catalytic gas used is argon, helium, carbon dioxide, and/or carbon monoxide, the production of metallic impurities is negligible, and the effect of the catalytic gas is independent of the gas density thereof. 10% by vol. or lower is sufficient. In fact, no difficulty is noted even if the amount of catalytic gas used is 1.0% by vol. or lower. Therefore, 1.0% by vol. or lower is acceptable. However, the stability of the ozone density is reduced when the gas density thereof becomes 0.025% by vol. or lower.

As is apparent from Table 6, the nitrogen gas used can be mixed with other gases if the amount of nitrogen gas is small. The other gas, even in this case, need not be added in an amount of 1.0% by vol. or more.

TABLE 1

The Specifications of Ozone Producing Machine

Figure 2B:
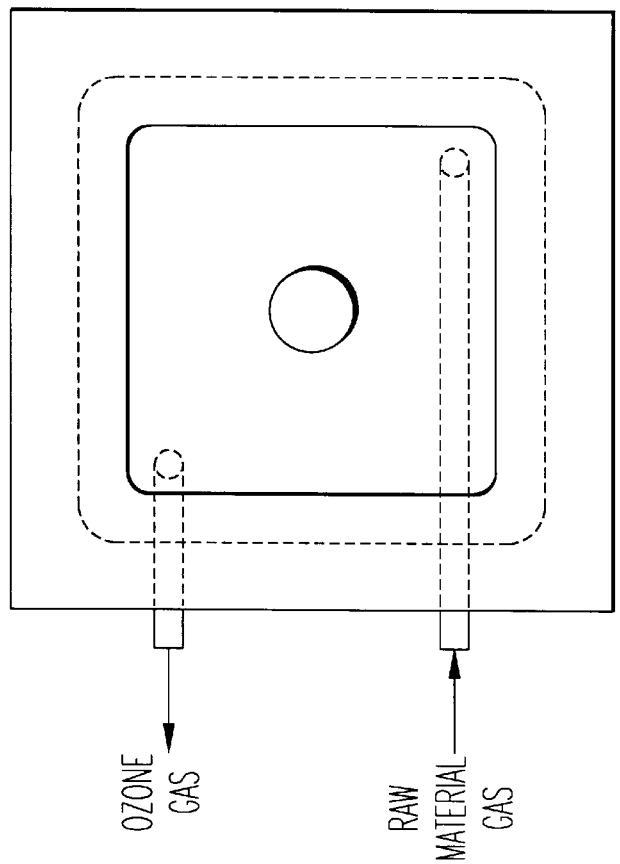
FIGS. 2A and 2B illustrate the use of the present invention with a discharge cell.
Figure 2A:
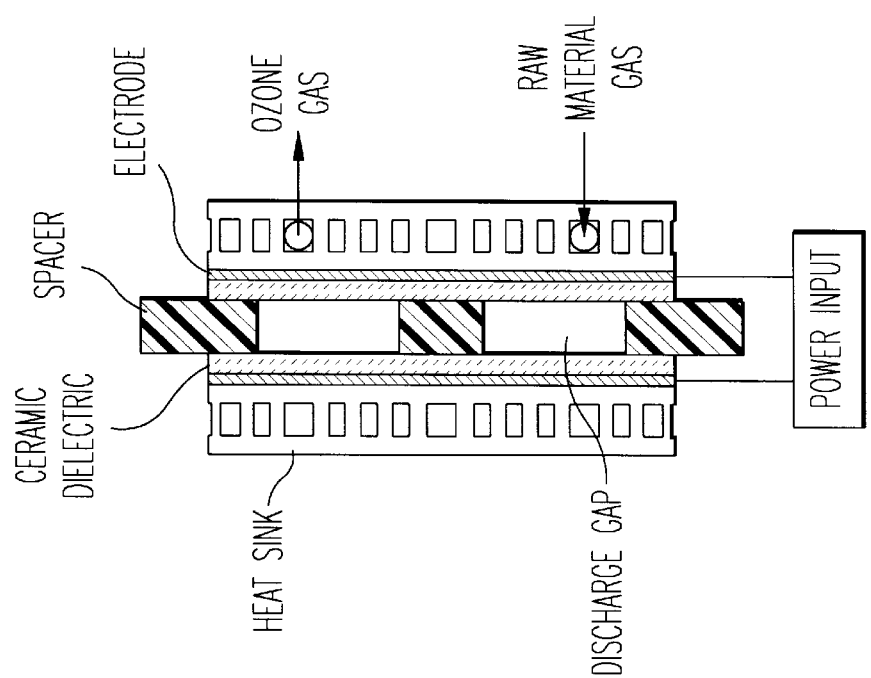

| | | |
|---|---|---|
| Discharge Cell | Construction | Plate type (See FIG. 2) |
| | Electrode | Ceramic coated electrode |
| | Cooling system | Air and water cooled |
| | Amount of discharge cells | 6 cells |
| Electric Specifications | Discharge voltage | ~10 kv (less than 10 kv) |
| | Discharge frequency | 500 through 1500 Hz |
| | Discharge power density | 0.5 through 1.5 w/cm$^2$ |
| | Power consumption | ~200 w/cell |

TABLE 2

| Element | C | Si | Mn | P | S | Ni | Cr | Mo | Fe |
|---|---|---|---|---|---|---|---|---|---|
| Component Ratio | <0.03% | <1.00% | <2.00% | <0.040% | <0.030% | 12.00~16.00% | 16.00~18.00% | 2.00~3.00% | residue |

TABLE 3

At the nitrogen addition time

| | | Additional Gas | | Nitrogen Oxide Amount | Metallic Impurity Amount ($10^{10}$ atoms/cm$^2$) | | | | Ozone | |
|---|---|---|---|---|---|---|---|---|---|---|
| Item | No | Kind | Addi. Amount | (ng/l) NO$_3$— | Cr | Fe | Ni | Reduction Effect | Density Stability | Economy (additional gas) |
| Comparative Example | 1 | nitrogen | 1.5% | 620000 | 310 | 120 | 0.61 | x | ○ | Δ |
| | 2 | nitrogen | 1.0% | 240000 | 300 | 110 | 0.55 | x | ○ | ○ |
| Present Invention | 3 | nitrogen | 0.9% | 95000 | 82 | 41 | 0.48 | Δ | ○ | ○ |
| | 4 | nitrogen | 0.60% | 76000 | 19 | 11 | 0.48 | Δ | ○ | ○ |
| | 5 | nitrogen | 0.50% | 58000 | 9.3 | 6.7 | 0.52 | ○ | ○ | ○ |
| | 6 | nitrogen | 0.20% | 17000 | 0.59 | 0.82 | 0.47 | ◉ | ○ | ○ |
| | 7 | nitrogen | 0.025% | 5900 | 0.45 | 0.78 | 0.53 | ◉ | ○ | ○ |
| Comparative Example | 8 | nitrogen | 0.020% | 5200 | 0.52 | 0.95 | 0.61 | ◉ | x | ○ |
| | 9 | no addition | | 300 | 0.44 | 0.82 | 0.49 | ◉ | x | ○ |

TABLE 4

At the argon addition time

| | | Additional Gas | | Nitrogen Oxide Amount | Metallic Impurity Amount ($10^{10}$ atoms/cm$^2$) | | | | Ozone | |
|---|---|---|---|---|---|---|---|---|---|---|
| Item | No | Kind | Addi. Amount | (ng/l) NO$_3$— | Cr | Fe | Ni | Reduction Effect | Density Stability | Economy (additional gas) |
| Comparative Example | 1 | argon | 12% | 250 | 0.62 | 0.84 | 0.54 | ◉ | ○ | x |
| | 2 | argon | 9.0% | 320 | 0.46 | 0.49 | 0.85 | ◉ | ○ | Δ |
| Examples (Present Invention) | 3 | argon | 4.5% | 430 | 0.76 | 0.63 | 0.33 | ◉ | ○ | Δ |
| | 4 | argon | 1.0% | 280 | 0.48 | 0.76 | 0.76 | ◉ | ○ | Δ |
| | 5 | argon | 0.90% | 390 | 0.71 | 0.65 | 0.62 | ◉ | ○ | ○ |
| | 6 | argon | 0.028% | 230 | 0.56 | 0.81 | 0.66 | ◉ | ○ | ○ |
| Comparative Example | 7 | argon | 0.020% | 180 | 0.45 | 0.84 | 0.81 | ◉ | x | ○ |
| | 8 | no addition | | 300 | 0.44 | 0.82 | 0.49 | ◉ | x | ○ |

TABLE 5

At the helium addition time

| Item | No | Additional Gas Kind | Addi. Amount | Nitrogen Oxide Amount (ng/l) NO$_3$— | Metallic Impurity Amount (10$^{10}$ atoms/cm$^2$) Cr | Fe | Ni | Ozone Reduction Effect | Density Stability | Economy (additional gas) |
|---|---|---|---|---|---|---|---|---|---|---|
| Comparative | 1 | helium | 11% | 290 | 0.75 | 0.46 | 0.79 | ⊙ | ○ | x |
| Example | 2 | helium | 8.8% | 350 | 0.62 | 0.52 | 0.32 | ⊙ | ○ | Δ |
| Examples | 3 | helium | 5.3% | 270 | 0.48 | 0.75 | 0.62 | ⊙ | ○ | Δ |
| (Present | 4 | helium | 1.0% | 490 | 0.92 | 0.95 | 0.45 | ⊙ | ○ | Δ |
| Invention) | 5 | helium | 0.88% | 470 | 0.83 | 0.61 | 0.43 | ⊙ | ○ | ○ |
|  | 6 | helium | 0.027% | 260 | 0.60 | 0.84 | 0.32 | ⊙ | ○ | ○ |
| Comparative | 7 | helium | 0.018% | 410 | 0.36 | 0.54 | 0.80 | ⊙ | x | ○ |
| Example | 8 | no addition |  | 300 | 0.44 | 0.82 | 0.49 | ⊙ | x | ○ |

TABLE 6

At the mixed gas addition time

| Item | No | Additional Gas | % | | % | Nitrogen Oxide Amount (ng/l) NO$_3$— | Metallic Impurity Amount (10$^{10}$ atoms/cm$^2$) Cr | Fe | Ni | Ozone Reduction Effect | Density Stability | Economy (additional gas) |
|---|---|---|---|---|---|---|---|---|---|---|---|---|
| Example | 1 | nitrogen | 0.2 | argon | 9.0 | 19000 | 0.75 | 0.82 | 0.48 | ⊙ | ○ | Δ |
|  | 2 | nitrogen | 0.2 | argon | 4.5 | 21000 | 0.51 | 0.96 | 0.39 | ⊙ | ○ | Δ |
|  | 3 | nitrogen | 0.2 | argon | 1.0 | 15000 | 0.55 | 0.74 | 0.51 | ⊙ | ○ | Δ |
|  | 4 | nitrogen | 0.2 | argon | 0.2 | 22000 | 0.81 | 0.61 | 0.73 | ⊙ | ○ | ○ |
|  | 5 | nitrogen | 0.2 | helium | 5.3 | 18000 | 0.86 | 0.81 | 0.46 | ⊙ | ○ | Δ |
|  | 6 | nitrogen | 0.2 | helium | 0.6 | 19000 | 0.89 | 0.72 | 0.49 | ⊙ | ○ | ○ |

TABLE 7

At the carbon dioxide addition time

| Item | No | Additional Gas Kind | Addi. Amount | Nitrogen Oxide Amount (ng/l) NO$_3$— | Metallic Impurity Amount (10$^{10}$ atoms/cm$^2$) Cr | Fe | Ni | Ozone Reduction Effect | Density Stability | Economy (additional gas) |
|---|---|---|---|---|---|---|---|---|---|---|
| Comparative Example | 1 | carbon dioxide | 15% | 150 | 0.32 | 0.82 | 0.34 | ⊙ | ○ | x |
|  | 2 | carbon dioxide | 7.5% | 260 | 0.75 | 0.33 | 0.71 | ⊙ | ○ | Δ |
| Examples (Present Invention) | 3 | carbon dioxide | 5.0% | 180 | 0.60 | 0.64 | 0.75 | ⊙ | ○ | Δ |
|  | 4 | carbon dioxide | 1.0% | 170 | 0.46 | 0.39 | 0.66 | ⊙ | ○ | Δ |
|  | 5 | carbon dioxide | 0.75% | 210 | 0.31 | 0.41 | 0.52 | ⊙ | ○ | ○ |
|  | 6 | carbon dioxide | 0.025% | 210 | 0.42 | 0.51 | 0.63 | ⊙ | ○ | ○ |
| Comparative Example | 7 | carbon dioxide | 0.010% | 190 | 0.33 | 0.39 | 0.82 | ⊙ | x | ○ |
|  | 8 | no addition |  | 300 | 0.44 | 0.82 | 0.49 | ⊙ | x | ○ |

TABLE 8

At the carbon monoxide addition time

| Item | No | Additional Gas Kind | Addi. Amount | Nitrogen Oxide Amount (ng/l) $NO_3-$ | Metallic Impurity Amount ($10^{10}$ atoms/cm$^2$) | | | Ozone Reduction Effect | Density Stability | Economy (additional gas) |
|---|---|---|---|---|---|---|---|---|---|---|
| | | | | | Cr | Fe | Ni | | | |
| Comparative Example | 1 | carbon monoxide | 14% | 190 | 0.91 | 0.81 | 0.96 | ◉ | ○ | x |
| | 2 | carbon monoxide | 8.0% | 210 | 0.31 | 0.40 | 0.21 | ◉ | ○ | Δ |
| Examples (Present Invention) | 3 | carbon monoxide | 5.0% | 220 | 0.41 | 0.55 | 0.62 | ◉ | ○ | Δ |
| | 4 | carbon monoxide | 1.0% | 150 | 0.31 | 0.42 | 0.61 | ◉ | ○ | Δ |
| | 5 | carbon monoxide | 0.80% | 220 | 0.71 | 0.79 | 0.86 | ◉ | ○ | ○ |
| | 6 | carbon monoxide | 0.030% | 160 | 0.92 | 0.71 | 0.86 | ◉ | ○ | ○ |
| Comparative Example | 7 | carbon monoxide | 0.020% | 150 | 0.66 | 0.72 | 0.60 | ◉ | x | ○ |
| | 8 | no addition | | 300 | 0.44 | 0.82 | 0.49 | ◉ | x | ○ |

Having described the present invention, it will now be apparent to those skilled in the art that many changes and modifications may be made to the above-described embodiments, without departing from the point of the present invention.

We claim:

1. A method of reducing metallic impurities in ozone gas piping means, which comprises producing ozone gas in ozone-generating means and piping said ozone gas to stainless piping means, wherein said ozone gas is produced from a raw material gas containing oxygen gas and nitrogen gas, said nitrogen gas being present in an amount of about 0.025% by volume to 0.25% by volume based upon the total raw material gas composition, to prevent reduction of ozone density with passage of time for said ozone gas as compared to when oxygen is used as a raw material gas without nitrogen to generate ozone, and wherein the ozone generating means is a silent electric discharge ozone generator.

2. The method of claim 1, wherein the raw material gas containing oxygen further contains one or more of helium, argon, carbon dioxide or carbon monoxide in an amount of about 0.025% by volume to 1.0% by volume.

3. The method of claim 1, wherein said oxygen gas of said raw material gas has a purity of at least 99.99%.

4. The method of claim 1, wherein said nitrogen gas of said raw material gas has a purity of at least 99.99%.

5. The method of claim 1, wherein said metallic impurities are selected from the group consisting of Ni, Cr and Fe.

* * * * *